United States Patent [19]

Czerewaty

[11] 4,281,861
[45] Aug. 4, 1981

[54] BALL JOINT

[75] Inventor: Frank P. Czerewaty, Houston, Tex.

[73] Assignee: Cameron Iron Works, Inc., Houston, Tex.

[21] Appl. No.: 67,414

[22] Filed: Aug. 17, 1979

[51] Int. Cl.³ .............................................. F16L 27/04
[52] U.S. Cl. ...................................... 285/265; 285/414
[58] Field of Search .................. 285/265, 15, 16, 261, 285/264, 114, 414

[56] References Cited

U.S. PATENT DOCUMENTS

| 957,694 | 5/1910 | MacDonald | 285/265 X |
| 1,615,774 | 1/1927 | Russell | 285/265 X |
| 3,977,707 | 8/1976 | Oliver | 285/265 |

Primary Examiner—Dave W. Arola
Attorney, Agent, or Firm—Vinson & Elkins

[57] ABSTRACT

A ball joint having first and second tubular members to be connected; the first tubular member extending toward the second tubular member and having an internal annular sealing means; the second tubular member extending toward the first tubular member and having an external annular spherical surface engaging within said sealing means, means for interconnecting the first and second tubular members so that relative pivoting of the members about the center of the annular spherical surface, the second tubular member and the sealing means being removable and replaceable through the flange connecting to the second tubular member.

7 Claims, 5 Drawing Figures

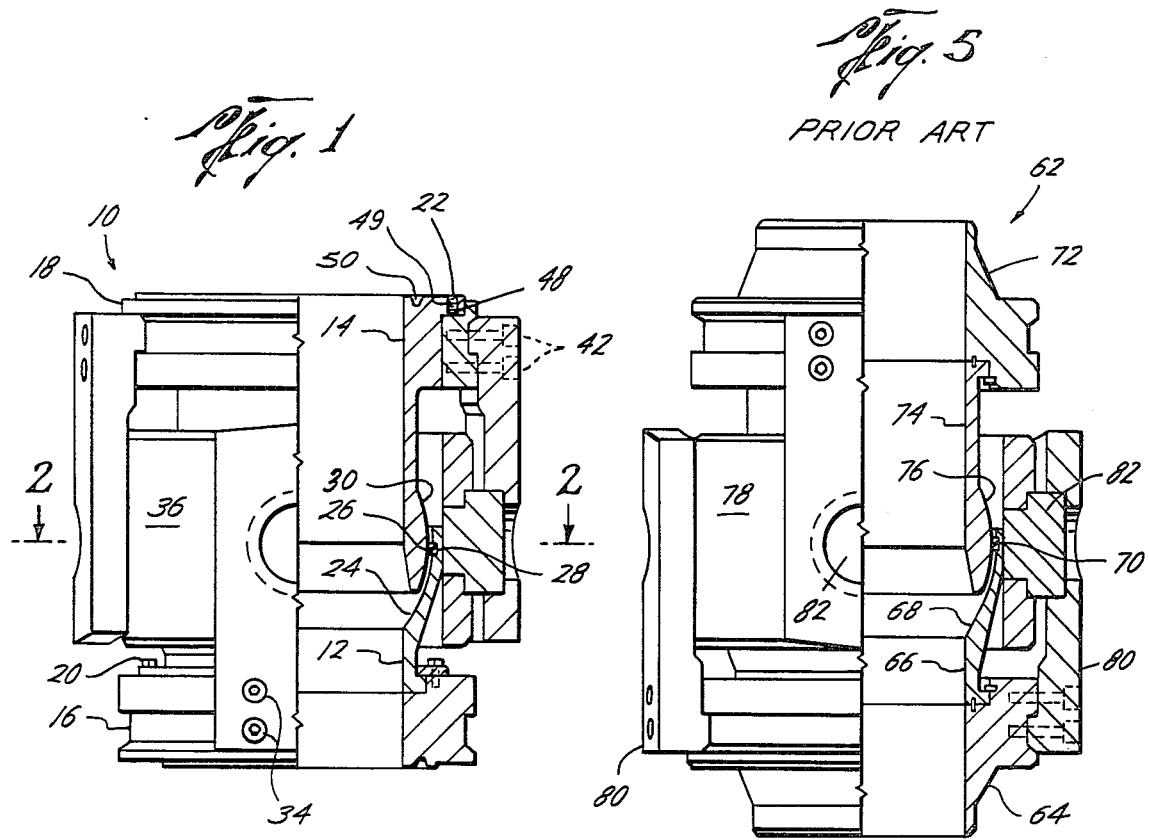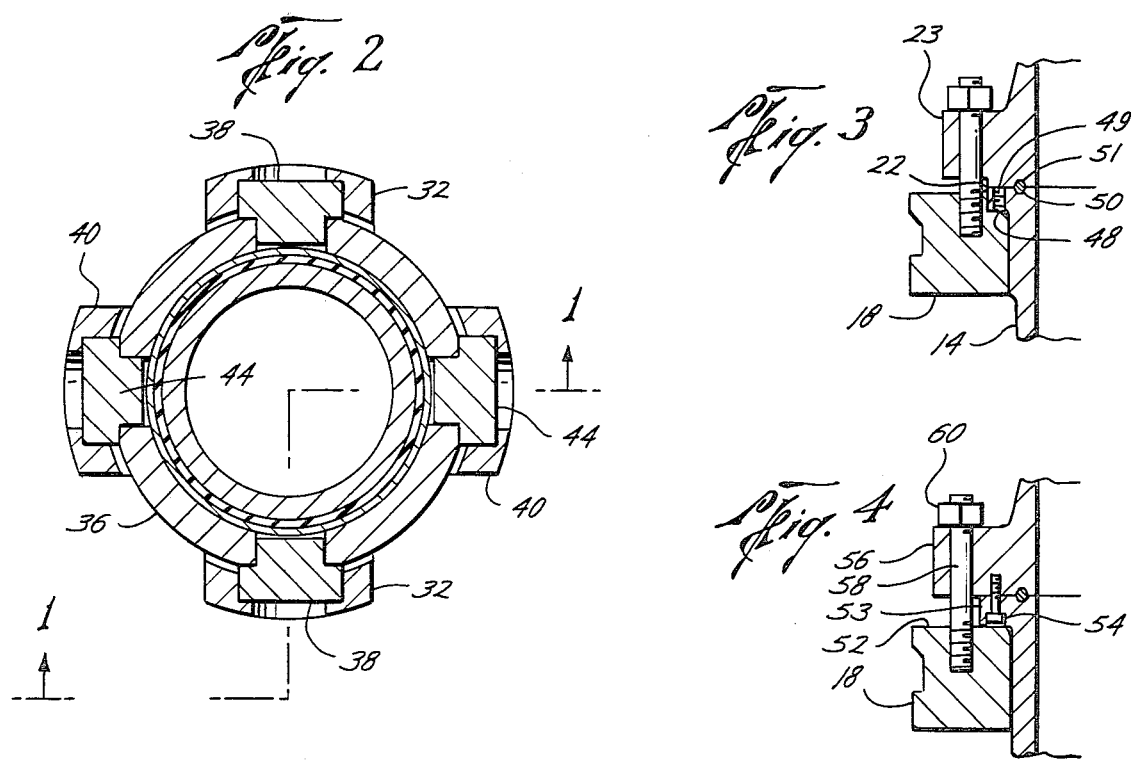

BALL JOINT

BACKGROUND

A ball joint of the prior art to which the present invention relates is shown in the J. P. Oliver U.S. Pat. No. 3,977,707. In such structure it is expected that wear will cause the seal and ball to be replaced before any other portion of the structure. As can be seen from the disclosure of such patent, the replacement of the ball and seal ring is accomplished by disconnecting the ball and its tubular member from the arms which connect to the gimbal ring.

The replacement of the ball and seal in such prior structure involves high fastener torques, manipulating heavy parts and accurately positioning such parts to prevent ball seal surface damage and to assure that the assembly remains properly shimmed.

SUMMARY

The present invention relates to an improved universal type ball joint in which the ball and ball seal may be replaced with a minimum of effort and without distorting the accurate positioning of the other parts of the joint. This is accomplished by making the ball member and seal removable through one flange without disconnecting and removing such flange from the remainder of the joint.

An object of the present invention is to provide an improved universal type ball joint in which the ball and seal may be quickly and simply replaced.

Another object is to provide an improved universal type ball joint in which the replacement of the ball and seal does not involve having to accurately reposition the joint elements or reshimming of the ball joint assembly.

A further object is to provide a universal type ball joint in which the replacement of the ball and seal is accomplished with a minimum disassembly of the joint.

BRIEF DESCRIPTION OF THE DRAWINGS

FIG. 1 is an elevation view, partly in section, of the improved ball joint of the present invention taken along line 1—1 in FIG. 2.

FIG. 2 is a sectional view taken along line 2—2 in FIG. 1.

FIG. 3 is a partial sectional view of the ball member flange, the joint flange and the riser flange to which the ball joint is connected.

FIG. 4 is a partial detailed view of a modified form of attachment of the ball sleeve to its tubular member.

FIG. 5 is an elevation view similar to FIG. 1 of a prior art ball joint.

DESCRIPTION OF THE PREFERRED EMBODIMENTS

The improved ball joint 10 as shown in FIGS. 1 and 2 includes first and second tubular members 12 and 14. Flanges 16 and 18 are connected to tubular members 12 and 14 to allow connection of joint 10 in a riser or other conduit with which it is to be used. Flange 16 is secured to tubular member 12 by fasteners 20. Flange 18 is held in position against the flange 22 of tubular member 14 by the mating flange 23 (FIG. 3) which connects flange 18 to the riser or other conduit (not shown).

Tubular member 12 at its inner end has a generally spherical shaped interior surface 24 with groove 26 in the intermediate portion of surface 24. Seal 28 is positioned in groove 26. Tubular member 14 has an external ball or spherical surface 30 at its inner end. Seal 28 engages surface 30 on member 14 and provides a seal so that fluids flowing through tubular members 12 and 14 are retained within joint 10.

The means for providing pivoting relationship between tubular members 12 and 14 is provided by arms 32 which are secured to flange 16 by cap screws 34 and to gimbal ring 36 by pins 38 and arms 40 which are secured to flange 18 by cap screws 42 and to gimbal ring 36 by pins 44. The pivot pins 38 and 44 all have their axes passing through the center of the spherical surfaces 24 and 30. With this structure any relative movement between tubular members 12 and 14 is about the center of surfaces 24 and 30. Since there is no eccentric relative movement between members 12 and 14 surface 30 remains in sealing engagement with seal 28 at all times.

The outer diameter of seal surface 30 is smaller than the inner diameter of flange 18 so that when the flange 23 mating with flange 18 is removed tubular member 14 may be withdrawn through flange 18 and seal 28 replaced without disconnecting the universal connections between flanges 16 and 18, arms 32 and 40 and gimbal ring 36. This maintains the pivotal center of the joint undisturbed. Care in properly locating tubular member 14 in flange 18 during its reinstallation is all that is needed to assure proper functioning and sealing of joint 10.

As shown in FIGS. 1 and 3 the upper end of member 14 includes flange 22 which seats on shoulder 48 of recess 49 in flange 18 to assure proper positioning of member 14. The flange 23 to which flange 18 is connected on assembly seats on seal ring 51 positioned in groove 50 in member 14 to retain member 14 against shoulder 48.

In the modified form of this invention shown in FIG. 4, the tubular member flange 53 seats on the outer surface 52 of flange 18 and is held in position by cap screws 54 extending through flange 53 into the flange 56 which is secured to the flange 18 by studs 58 and nuts 60.

The joint 62 of the prior art shown in FIG. 5 includes first tubular member 64 having first sleeve 66 attached thereto and extending inward terminating in an enlarged section 68 with an internal seal 70; second tubular member 72 having second sleeve 74 with external partial spherical surface 76 positioned in sealing engagement with seal 70; and gimbal ring 78, arms 80, pins 82 connecting between tubular members 64 and 72 to assure pivoting about the center of surface 76.

To remove and replace seal 70 and second sleeve 74, arms 80 are disconnected from second tubular member 72 and it is removed with second sleeve 74. On reassembly, care is taken to assure that the proper pivotal relationship is established between the two sleeves.

What is claimed is:

1. A ball joint comprising
    a first tubular member having an enlarged inner diameter at one end thereof with an internal groove,
    a seal ring in said internal groove,
    a second tubular member having a partial external spherical surface on one end thereof,
    the spherical surface of said second tubular member being positioned within said one end of said first tubular member in sealing engagement with said seal ring, a first flange having an inner diameter sufficiently large to allow installation and removal of said second tubular member therethrough, means connecting said first flange to the other end of said second tubular member from said spherical surface, and means interconnecting said first tubular member and said first flange whereby relative pivoting between said tubular members is maintained about the center of said spherical surface, said second tubular member being removable and replaceable through said first flange without disconnecting said interconnecting means when said first flange is free of connections other than said interconnecting means.

2. A ball joint according to claim 1 wherein said connecting means includes a flange on the other end of said second tubular member, and means for retaining said tubular member flange in engagement with said first flange.

3. A ball joint according to claim 2 wherein said first flange has a shoulder for receiving said tubular member flange.

4. A ball joint according to claim 2 wherein said retaining means includes fastening means extending through said tubular member flange and adapted to engage in a flange to which said first flange is to be connected.

5. A ball joint according to claim 1 including a flange on the end of said second tubular member opposite said spherical surface and seated on the outer surface of said first flange to support said second tubular member with its spherical surface in sealing engagement with said seal ring, said flange being a part of said connecting means.

6. A ball joint according to claim 1 including a second flange secured to the other end of said first tubular member from said one end, said second flange being a part of said interconnecting means.

7. A ball joint according to claim 6 wherein said interconnecting means includes a gimbal ring, arms pivotally connected to said gimbal ring and to said first flange, and arms pivotally connected to said gimbal ring and to said second flange.

* * * * *